(12) United States Patent
White

(10) Patent No.: US 6,810,716 B1
(45) Date of Patent: Nov. 2, 2004

(54) APPARATUS AND METHOD FOR ANALYSIS OF HEADSPACE GASES OF A POUCH

(75) Inventor: Norman R. White, Mt. Vernon, OH (US)

(73) Assignee: Abbott Laboratories, Abbott Park, IL (US)

( * ) Notice: Subject to any disclaimer, the term of this patent is extended or adjusted under 35 U.S.C. 154(b) by 0 days.

(21) Appl. No.: 10/464,919

(22) Filed: Jun. 19, 2003

(51) Int. Cl.[7] .............................................. G01M 3/00
(52) U.S. Cl. ........................................ 73/52; 73/23.2
(58) Field of Search .................................. 73/52, 23.2

(56) References Cited

U.S. PATENT DOCUMENTS

| | | | | |
|---|---|---|---|---|
| 3,572,096 A | * | 3/1971 | Meyer | 73/40.7 |
| 4,096,734 A | * | 6/1978 | Khayat | 73/23.41 |
| 4,282,744 A | * | 8/1981 | Dick | 73/49.3 |
| 5,363,707 A | * | 11/1994 | Augenblick et al. | 73/864.84 |
| 6,119,534 A | * | 9/2000 | Dinsmore | 73/864.91 |
| 6,286,375 B1 | * | 9/2001 | Ward | 73/863.12 |
| 6,324,923 B1 | * | 12/2001 | Dinsmore | 73/863.12 |

* cited by examiner

Primary Examiner—Hezron Williams
Assistant Examiner—Rodney Frank
(74) Attorney, Agent, or Firm—William J. Winter; Thomas D. Brainard

(57) ABSTRACT

Disclosed is a test container for the release and containment of headspace gases from pouches comprises a housing sealed with a lid and a pouch opening device. Determination of the concentration of a particular gas component is conducted by analyzing a background sample of gas within the test container prior to opening the pouch within the sealed test container. An equilibrated mixture of background and pouch headspace gas is analyzed and compared to results of background gas analysis.

12 Claims, 2 Drawing Sheets

APPARATUS AND METHOD FOR ANALYSIS OF HEADSPACE GASES OF A POUCH

FIELD OF THE INVENTION

This invention pertains to an apparatus and method for the analysis of headspace gases obtained from a pouch. Particularly, the invention relates to a sealed test container containing a pouch-opening device for releasing the headspace gases of a pouch to the container. Prior to opening the pouch to release headspace gases, background gases within the sealed container are sampled for analysis. Upon release of the pouch headspace gases into the sealed container, a sample of the equilibrated background and headspace gases is drawn from the test container for analysis.

BACKGROUND OF THE INVENTION

Commercially prepared and packaged consumable products decompose over time. During this decomposition, gases may be released from the products and accumulate within the package. Sampling and characterization of the gases that accumulate within such packages is useful in determining decomposition modes for such products and may eventually lead to increased shelf life of the products.

Sampling gases that accumulate within the headspace of pouches used as packages is particularly difficult if pressure has built up within the pouch. For example, the puncture of a pouch under pressure for the purposes of obtaining a headspace gas sample may cause popping of the pouch or release of the headspace gases prior to obtaining a sample of sufficient size and integrity for analysis. Gas sampling methods generally require "spiking" meaning the addition of an amount of gas having a known composition and concentration into the sample of gas to be tested. Spiking steps serve to create additional pressure within the pouch causing increased instances of rupture of the pouch prior to obtaining a sample.

There is a need for instrumentation and methods for containing headspace gases in a manner sufficient to allow sampling of the gases obtained from a pouch container. There is further a need for instrumentation and methods for sampling the headspace gases once the gases are contained.

The present invention is directed to a test container and method for containing and allowing the sampling of headspace gases accumulated within a pouch container. The present invention also provides a method for sampling and analyzing the headspace gases contained within the test container.

SUMMARY OF THE INVENTION

In one embodiment a pouch headspace gas test container is provided. The test container has a housing having a closed end and an open end; a lid having a rim sized to cover the open end; at least one valve transverse to a wall of the housing, one of said at least one valves having a septum; and a pouch opening device; wherein the pouch opening device comprises an upper block, a weighted lower block, at least one guide slidably connecting the weighted lower block to the upper block, and a puncturing device secured to the weighted lower block.

In a further embodiment, the test container has a gas tight seal formed between the lid and the housing.

In a further embodiment, the upper block is positioned above the weighted lower block and a pouch is oriented between the upper block and weighted lower block.

In still a further embodiment, the housing is oriented with the weighted lower block positioned above the upper block; and the puncturing device is secured to the weighted lower block and breaches a pouch positioned between the upper block and weighted lower block.

In yet a further embodiment, the puncturing device is a knife, and in yet a further embodiment, the puncturing device is at least one nail.

In a further embodiment, the upper block and the weighted lower block are separated by a distance equal to the thickness of the pouch and any residual solid or liquid.

In another embodiment, the test container further comprises a receptacle formed within the upper block to receive the puncturing device.

In another embodiment, a method for analyzing a headspace gas of a pouch is provided. The method comprises the steps of placing said pouch between an upper plate and weighted lower plate within a gas test container; creating a gas tight seal between the test container and a lid; obtaining a background sample of gas contained within the sealed test container; puncturing the pouch within the sealed test container and forcing said headspace gas from the pouch and into the test container; allowing time for the background gas and the headspace gas to equilibrate; obtaining a sample of the equilibrated gases; and comparing the background sample to the equilibrated gas sample.

In a further embodiment, the method further comprises the step of flushing the test container with an inert gas prior to obtaining the background sample.

In a further embodiment, the method further comprises the step of calculating the number of moles of gas per gram of a pouch powder; wherein the headspace gas of the pouch is derived from a powder within the pouch.

In a further embodiment, the method further comprising the step of determining a mass balance of at least one product element and at least one decomposition element within the pouch.

DETAILED DESCRIPTION OF THE INVENTION

Figure 1:
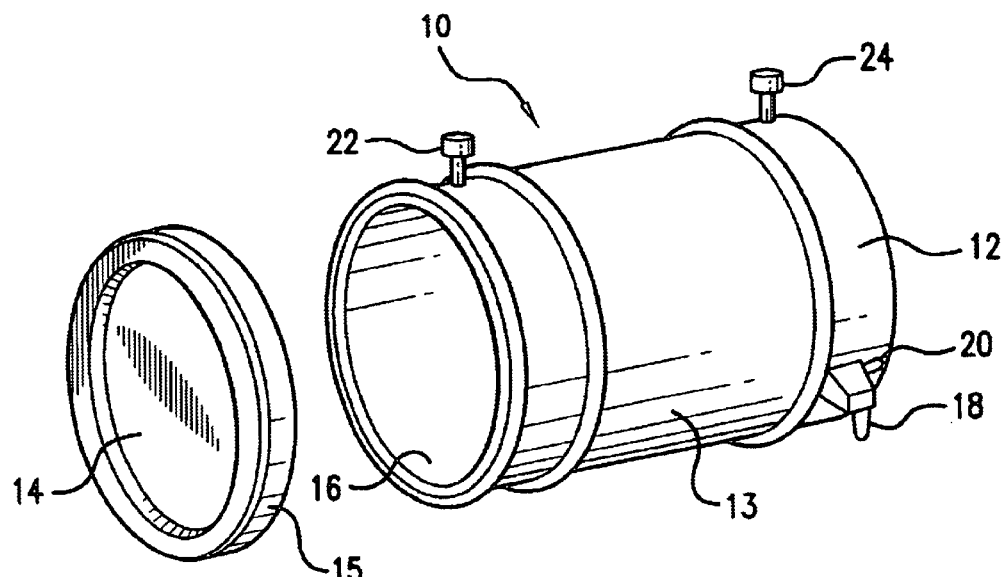
FIG. 1 is a perspective view of a test container of an embodiment of the present invention.
Figure 4:
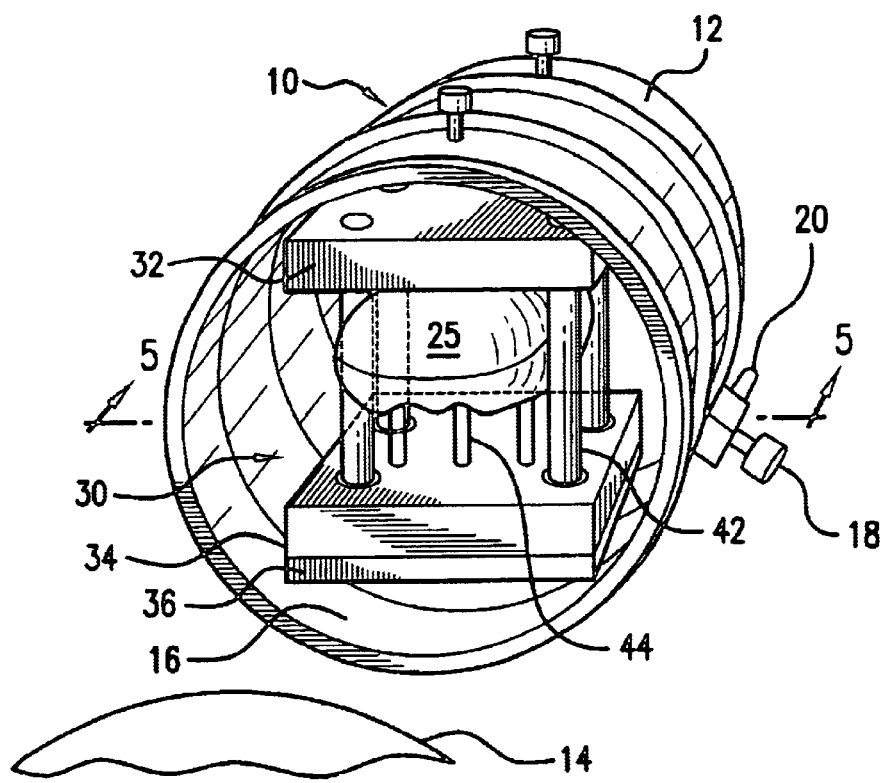
FIG. 4 is a perspective view of an embodiment of the invention with pouch opening device depicted in FIG. 2 placed inside the test container of FIG. 1.
Figure 5:
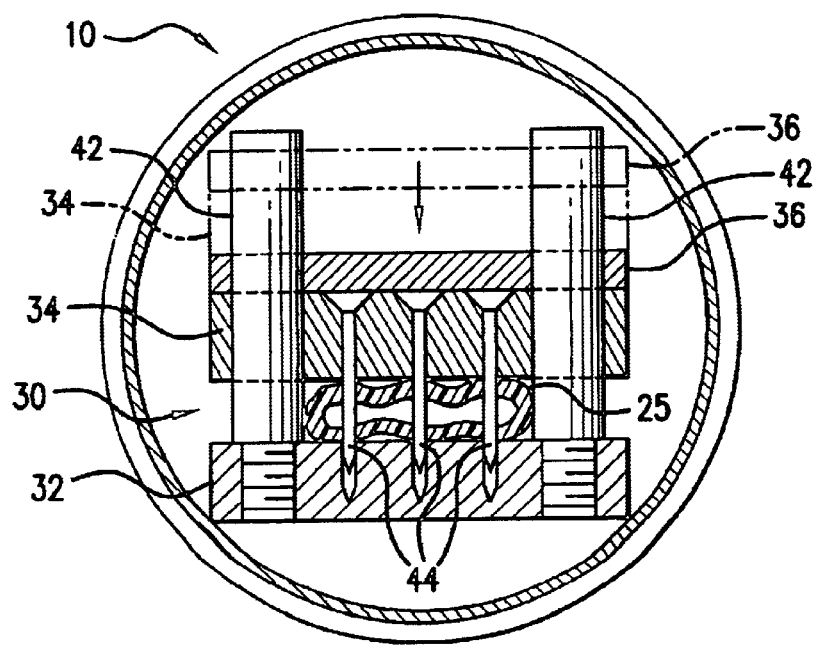
FIG. 5 is a cross-section of an embodiment of the test container of the present invention having the pouch-opening device of FIG. 2 oriented such that the pouch is punctured and headspace gases force into the test container.

In accordance with the present invention, headspace gases may be analyzed by releasing them into a test container 10 as represented in FIG. 1. A housing 12, such as a cylindrical canister, has a wall 13 and a lid 14 having a rim 15 that fits over an open end 16 of the housing 12. Housing 12 also includes a closed end 17. The closed end 17 of the housing 12 may be permanently closed or may be closed by an additional lid and rim in a manner similar to that of the lid 14 and rim 15 fitting over the open end 16. The housing has a septum 18 in contact with a valve 20 such that when the valve 20 is in an open flow position, a sample of gases contained within the housing 12 may be withdrawn through the septum 18. Additional valves 22, 24 may be used to purge the housing 12 of atmospheric gases prior to placement of a pouch 25 (as shown in FIGS. 4 and 5) within the test container 10. However, valves 22, 24 that are in addition to the valve 20 associated with the septum 18 are not required if the test container 10 will not be purged with purge gas such as nitrogen or a known gas composition such as a standardized mixtures of oxygen, nitrogen and carbon dioxide.

Figure 2:
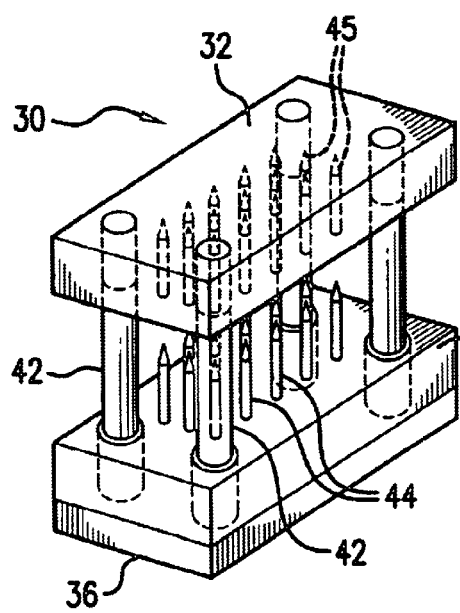
FIG. 2 depicts a pouch-opening device including nails as puncturing devices.
Figure 3:
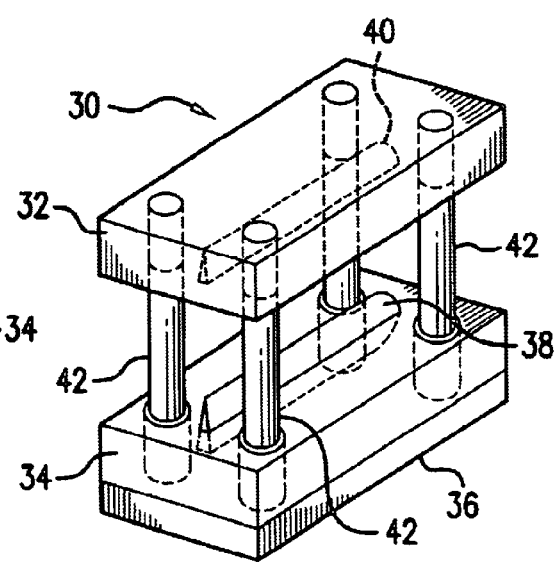
FIG. 3 depicts a pouch-opening device including a knife as a puncturing device.

The headspace gas of the pouch within the test container 10 is released by a pouch opening device 30 as depicted in FIGS. 2 and 3. The pouch-opening device 30 of this embodiment consists of an upper block 32 and a lower block 34. The blocks 32, 34 may, for example, be wood, metal or plastic blocks. The lower block 34 is weighted relative to the upper block 32 such as by a weighted plate 36, such as a metal plate, secured to the lower block 34. A puncturing device is mounted on the lower block 34. The upper block 32 has a receptacle formed within it that is shaped and sized to receive the puncturing device. The puncturing device 30 depicted in FIG. 3 is a knife 38 secured to the lower block 34. The upper block contains a groove 40 into which the knife 38 protrudes when the upper block 32 and lower block 34 are moved together. Guides 42 connect the upper block 32 and lower block 34. The lower block 34 moves along the guides 42 by sliding when the test container 10 is shaken, rotated or otherwise oriented such that the weighted lower block 34 is positioned above the upper block 32.

Another embodiment of the pouch-opening device 30 is the puncturing device depicted in FIG. 2, which is at least one nail 44 or at least one row of nails mounted to the lower block 34. The upper block 32 of FIG. 2 includes holes 45 as receptacles for receiving the nail 44 or nails when the upper block 32 and weighted lower block 34 are brought together.

The pouch-opening device 30 is placed inside the housing 10 as depicted in FIGS. 4 and 5. During operation, the pouch 25 containing headspace gases is placed between the upper block 32 and lower block 24 and inside the guides 42 and then the pouch opening device 30 is placed inside the housing 12. Vacuum grease is place around the rim 15 of the lid 14 and placed onto the open end 16 of the housing 12. The lid 14 is lifted at the rim 15 in order to force excess air out of the housing 12 such that the lid 14 is flat or slightly indented relative to the open end 16 of the housing 12. Samples of the background gases within the housing 12 may be obtained from the septum 18 with a gas-tight syringe (not shown) and analyzed for composition or concentration of a particular component. To obtain the best sample of gases, the sample-collecting end of the syringe is preferably extended into the test container 10 rather than into the neck of the septum 18 or valve 20.

After the background gases have been sampled for analysis or characterization, the housing 12 is rotated or shaken such that the weighted lower block 34 moves along the guides 42 toward the upper block 32. The movement of the weighted lower block 34 along the guides 42 toward the upper block 32 brings the knife 38 or nail 44 mounted on the lower block 34 into contact with the pouch 25 and punctures, pierces or slices open the pouch 25. The force by which the blocks 32, 34 come together not only causes the knife 38 or nail 44 to puncture the pouch 25 thereby releasing the headspace gases within the pouch 25 into the housing 12, but also serves to force the gases from the pouch into the housing 12. After allowing for a period of time sufficient for the pouch 25 headspace gases and background gas within the housing 12 to reach equilibrium, a sample of the equilibrated gases is removed from the septum 18 and analyzed for comparison with the background gas.

Prior to obtaining a background sample of gases from the sealed test container 10, the housing 12 was tested for leaks. The lid 14 was sealed onto the housing 12 and the housing 12 was flushed with nitrogen gas. The sealed housing 12 was then left undisturbed overnight and subsequently tested for $CO_2$ content. It was determined that the best sealing conditions were obtained with the use of sealant compound, such as silicone, placed on the rim 15 of the lid 14.

The time required for the gaseous contents of the test container 10 to reach equilibrium was determined by adding 5 cubic centimeters of 15.19% $CO_2$ standard to a nitrogen flushed test container 10. $CO_2$ levels within the sealed container 10 were monitored over time with periodic gas samples extracted from the septum 18. The gas samples were analyzed by gas chromatography (Hewlett Packard Model 5890, on HAYESEP DOX column of 80/100 mesh, 6'×⅛" SS by Alltech Associates, Inc.) with thermal conductivity detection. The results of these tests are shown in Tables 1 and 2.

TABLE 1

Run 1 For Equilibrium Evaluation

| Description | $CO_2$ Peak Area |
|---|---|
| Nitrogen Flushed Container | 0 |
| T = 0 (addition of $CO_2$ standard) | 9859 |
| T = 35 minutes | 5501 |
| T = 45 minutes | 5853 |
| T = 60 minutes | 5679 |

TABLE 2

Run 2 For Equilibrium Evaluation

| Description | $CO_2$ Peak Area |
|---|---|
| Nitrogen Flushed Container | 0 |
| T = 0 (addition of $CO_2$ standard) | 6822 |
| T = 15 minutes | 6104 |
| T = 30 minutes | 6181 |
| T = 70 minutes | 6023 |

Similar equilibrium testing was conducted using pouches 25 that contained about 2.8 grams of a Nutritional Powder (similar to the aged nutritional powder referenced hereinafter in the Example Section). The results of these equilibrium tests are shown in Tables 3 and 4.

TABLE 3

Run 3 - Equilibrium Evaluation Of Test Pouch C

| Description | $CO_2$ Peak Area |
|---|---|
| 5% $CO_2$ standard in $N_2$ gas | 558,457 |
| Nitrogen Flushed Container | 830 |
| Repeat $N_2$ Flush | 565 |
| T = 5 minutes (after open pouch C) | 447,118 |
| Repeat T = 5 minutes | 438,399 |
| Repeat T = 5 minutes | 305,603 |
| T = 30 minutes | 303,175 |

TABLE 4

Run 4 - Equilibrium Evaluation Of Test Pouch C-2

| Description | $CO_2$ Peak Area |
|---|---|
| 5% $CO_2$ standard in $N_2$ gas | 643,367 |
| Blank | 2,438 |
| Repeat Blank | 2,845 |
| Nitrogen Flushed Container | 0 |
| T = 5 min. (after open pouch C-2) | 430,974 |
| T = 12 minutes | 532,611 |
| T = 15 minutes | 339,524 |
| T = 20 minutes | 348,905 |
| T = 65 minutes | 329,749 |

Results from Tables 1–4 indicate that approximately 15 minutes are required in order for the background gases inside the test container 10 and the headspace gases from the pouch 25 to reach equilibrium.

The accuracy of the testing method described herein was tested by determining the volume of the test container (0.565 L) and then determining the gas chromatography response to a $CO_2$ injection of a 15.19% reference standard in nitrogen using a thermal conductivity detector. The peak area was integrated. The background $CO_2$ in the sealed test container was determined and then the sealed test container was spiked with a 5.0 mL volume of 15.19% $CO_2$ reference standard. The reference standard and background gases were allowed to equilibrate, then were sampled for $CO_2$ levels.

The background $CO_2$ level was determined coincide to a peak area of 3,320. The peak area for spiked background was 8,780 and a direct injection of 15.19% $CO_2$ into the GC was 640,522. The expected peak area for the spiked sample is (5.0 mL /570 mL)×640,522, or 5,619. The measured peak area for the spiked sample 8,780–3,320, or 5460. The $CO_2$ standard addition recovery is (5,460/5,619)×100%, or 97.2%. Multiple similar tests yielded standard addition recovery rates of 97.2%, 97.9% and 98.8%.

EXAMPLE

The headspace gases of a low density polyethylene film pouch containing an aged nutritional powder were analyzed for their carbon dioxide ($CO_2$) content. The volume of the test container 10 was measured with the pouch opening device 30 inside by determining the weight of deionized water required to fill the test container 10. The volume was determined to be 0.565 L. The pouch 25 was weighed and the weight recorded as "total weight." The sides of the pouch 25 were folded to fit between the guides 42 and between the upper block 32 and weighted lower block 34. The lid 14 was sealed onto the housing 12 of the test container 10 using silicone vacuum grease. The rim 15 of the lid 14 was lifted slightly while the center of the lid 14 was depressed in order to remove excess air from the test container 10. The lid 14 is preferably flat or slightly indented after sealing the lid 14 to the housing rather than the lid 14 bulging or protruding from the container 10. Background samples of gas were taken from the sealed test container 10, through the septum 18 with a Gas Tight Syringe (Hamilton, Reno, Nev., USA) with a MININERT Syringe Valve (Alltech Associates, Inc., Deerfield, Ill.) and Luer hub needle suitable for GC injection. The test container 10 was then shaken to allow the knife 38 on the lower weighted place 34 to slide along the guides 42 toward the upper plate 32 thereby puncturing and releasing the contents of the pouch 25. Samples of the gas mixture, meaning background and headspace gas, were taken at various times after the rupture of the pouch 25. The $CO_2$ content of the background gas and gas mixture were analyzed by gas chromatography as described earlier and measured against calibration gases of 5.0% $CO_2$ in nitrogen and 15.0% $CO_2$ in nitrogen (Alltech Associates). In addition to the headspace gas, the nutritional powder was released into the test container 10 as well. The time allowed for equilibration of gases also allows time for the powder to settle and aids in keeping the sample syringes from plugging. Sample volumes of 100 microliters were taken at about 23° C. for background and equilibrated background plus headspace gas samples. Runs 1 and 2 of this testing determination are presented in Tables 5 and 6, respectively.

TABLE 5

Run 1 of $CO_2$ Determination of Nutritional Powder Aged Headspace Gas

| Sample Description | $CO_2$ Peak Area |
|---|---|
| Background | 2,405 |
| Background | 2,446 |
| T = 5 min. (after open pouch) | 180,279 |
| T = 15 minutes | 171,121 |
| T = 40 minutes | 161,428 |
| T = 45 minutes | 169,177 |

TABLE 6

Run 2 of $CO_2$ Determination of Nutritional Powder Aged Headspace Gas

| Sample Description | $CO_2$ Peak Area |
|---|---|
| Background | 11,407 |
| Background | 12,123 |
| Background | 12,381 |
| T = 15 minutes (after open pouch) | 173,637 |
| T = 25 minutes | 173,965 |

After the background and equilibrated samples have been taken, the test container 10 was opened and the pouch 25 removed. The pouch 25 was opened completely by cutting it with scissors, the inner surface of the pouch 25 was cleared and wiped clean of residual powder. The empty pouch was then weighed and its weight recorded as "pouch material weight." The number of moles of $CO_2$ per gram of Nutritional Powder can be calculated as follows.

Determine that area representing the $CO_2$ released from the pouch by subtracting the average background $CO_2$ peak area from the mean total $CO_2$ peak area (of the calibrated sample containing background and pouch headspace gas). Calculate the percent of $CO_2$ in the container from the pouch headspace by using the linear regression curve created by the axis origin and the 5.0% and 15.0% $CO_2$ standards and the area difference between the background and equilibrated gas sample peaks.

For Run 1 the average $CO_2$ peak from the background samples is 2,426, and the mean total peak area is 170,501. The area representing $CO_2$ released from the pouch headspace is 170,501−2426=168,075. Using the ideal gas law, PV=nRT, the moles of gas in the test container are calculated.

$$n = PV/RT$$

where n=number of moles of gas;
P=Pressure in atmospheres
V=Volume of the test container in Liters
R=Constant (0.0821 Liter×atm/mole×K)
T=Temperature in degrees Kelvin (degrees Celsius plus 273)
Therefore, number of moles in the container=(1 atm)(0.565 L)/(0.0821)(deg. Kelvin).

At 23° C. the number of moles in the container is 0.0232.

The number of micromoles of $CO_2$ per gram of the Nutritional Powder was determined by incorporating Dalton's law of partial pressures (i.e., the sum of the partial pressures of the different gases in a mixture is equal to the total pressure of the mixture). The sample weight was calculated by subtracting the pouch material weight from the pouch total weight (taken prior to the pouch being placed in the test container). Using this weight and the percent $CO_2$ from the linear regression curve, the micromoles of $CO_2$ per gram of powder is: moles $CO_2$ in container=(headspace % $CO_2$/weight in grams)×(1×10$^6$ micromoles/mole).

Mass balance determinations of three alpha-keto acids (KIC, KIV, and KMV) from the Nutritional Powder were made by measuring the concentrations of six analytes in pouched Nutritional Powder that had been stored for six months at 30° C. and by measuring the same six analytes in the same lot of pouched Nutritional Powder that had been stored at −20° C. for six months. The six analytes along with their concentration differences are listed in Table 7.

TABLE 7

Mass Balance Data for Nutritional Powder

| Nutritional Powder Analyte | Concentration Change, 30° v −20° |
|---|---|
| KIC + KIV + KMV | −216 micromoles/gram |
| $CO_2$ | +215 micromoles/gram |
| D,L-Leucine | +6 micromoles/gram |
| D,L-Isoleucine | +2 micromoles/gram |

The results of Table 7 provide further support for method accuracy because decarboxylation is a known important route of alpha-keto acid degradation and the increase of observed $CO_2$ difference between the pouches and the decrease of the observed alpha-keto acid difference between the pouches are virtually identical.

The use of any and all examples, or exemplary language (e.g., "such as" or "for example") provided herein, is intended merely to better illuminate the invention and does not pose a limitation on the scope of the invention unless recited in a claim. While some potential advantages and objects have been expressly identified herein, it should be understood that some embodiments of the invention may not provide all, or any, of the expressly identified advantages and objects. Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A pouch headspace gas test container, the test container comprising:

a housing having a closed end and an open end;

a lid having a rim sized to sealingly close the open end;

at least one valve that transverses a wall of the housing, wherein one of said at least one valves has a septum; and a pouch opening device; wherein the pouch opening device comprises an upper block, a weighted lower block, at least one guide slidably connecting the weighted lower block to the upper block, and a puncturing device secured to the weighted lower block.

2. The test container of claim 1 wherein a gas tight seal is formed between the lid and the housing.

3. The test container of claim 2 wherein the upper block is positioned above the weighted lower block so that a pouch may be oriented between the upper block and weighted lower block.

4. The test container of claim 2 wherein the housing is oriented with the weighted lower block positioned above the upper block; and wherein the puncturing device secured to the weighted lower block is capable of breaching a pouch positioned between the upper block and weighted lower block.

5. The test container of claim 4 wherein the puncturing device is a knife.

6. The test container of claim 4 wherein the puncturing device is at least one nail.

7. The test container of claim 4 wherein the upper block and the weighted lower block are separated by a distance equal to the thickness of the pouch.

8. The test container of claim 1 further comprising a receptacle formed within the upper block to receive the puncturing device.

9. A method for analyzing a headspace gas of a pouch, the method comprising the steps of:

placing said pouch between an upper plate and a weighted lower plate within a gas test container;

creating a gas tight seal between the test container and a lid;

obtaining a background sample of gas contained within the sealed test container;

puncturing the pouch within the sealed test container and forcing said headspace gas from the pouch and into the test container;

allowing time for the background gas and the headspace gas to equilibrate;

obtaining a sample of the equilibrated gases; and comparing the background sample to the equilibrated gas results.

10. The method of claim 9 further comprising the step of flushing the test container with an inert gas prior to obtaining the background sample.

11. The method of claim 9 further comprising the step of calculating the number of moles of gas per gram of a pouch powder; wherein the headspace gas of the pouch is derived from a powder within the pouch.

12. The method of claim 9 further comprising the step of determining a mass balance of at least one product element and at least one decomposition element within the pouch.

* * * * *